United States Patent [19]

Husslein

[11] Patent Number: 5,479,354
[45] Date of Patent: Dec. 26, 1995

[54] METHOD FOR THE COMPUTER-ASSISTED CONTROL OF A MACHINE OR PROCESS

[75] Inventor: Manfred Husslein, Weinheim, Germany

[73] Assignee: HMR GmbH, Weinheim, Germany

[21] Appl. No.: 81,348

[22] PCT Filed: Dec. 24, 1991

[86] PCT No.: PCT/DE91/01008

§ 371 Date: Jun. 28, 1993

§ 102(e) Date: Jun. 28, 1993

[87] PCT Pub. No.: WO92/12471

PCT Pub. Date: Jul. 23, 1992

[30] Foreign Application Priority Data

Dec. 27, 1990 [DE] Germany .......................... 40 41 869.3

[51] Int. Cl.[6] .................................................. G06F 15/46
[52] U.S. Cl. ................. 364/474.22; 364/474.26; 364/101; 364/146
[58] Field of Search .................... 364/146, 168–192, 364/474.22, 474.24, 474.26, 474.33, 474.35

[56] References Cited

U.S. PATENT DOCUMENTS

| 4,740,885 | 4/1988 | Gose et al. | 364/149 |
| 4,816,731 | 3/1989 | Boulton et al. | 318/569 |
| 4,855,925 | 8/1989 | Bhateja | 364/474.22 |
| 4,918,612 | 4/1990 | Handte | 364/474.22 |
| 5,051,912 | 9/1991 | Johanson et al. | 364/474.04 |
| 5,093,796 | 3/1992 | Takada et al. | 364/474.22 |
| 5,321,603 | 6/1994 | Schwenke | 364/146 |

FOREIGN PATENT DOCUMENTS

| 0070654 | 1/1983 | European Pat. Off. . |
| 3408523 | 9/1985 | Germany . |
| WO87/03712 | 6/1987 | WIPO . |

Primary Examiner—Roy N. Envall, Jr.
Assistant Examiner—Thomas E. Brown
Attorney, Agent, or Firm—Bell, Seltzer, Park & Gibson

[57] ABSTRACT

A method for the computer-assisted control of a machine or a process using a process computer connected to the machine, installation, or the like via an interface, a monitor connected to the process computer for the graphic display of the machine or process cycle, and an input device, preferably in the form of a keyboard, for programming a control or predetermining set values, the control being based on a machine or process-specific flow chart, is designed to take account of the real-time behavior of a machine or a process such that the programming of the control process or the predetermination of the machining steps proceeds from vectors and/or curves, and that the real-time behavior of the machine or process is considered in that the machining steps and thus the individual movements are converted by including the machine and process-specific data into the form of a process-linked polygonal course.

19 Claims, 2 Drawing Sheets

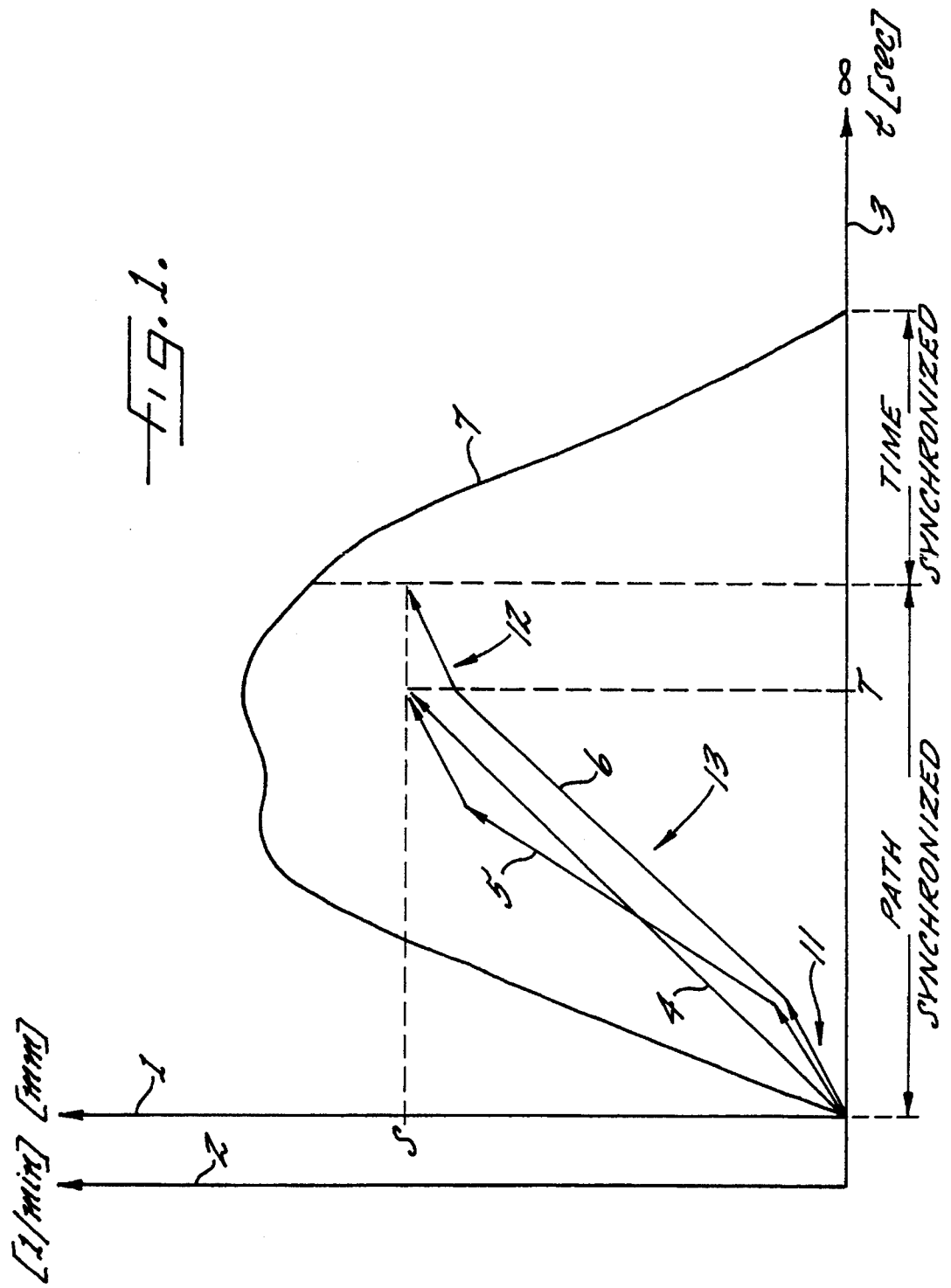

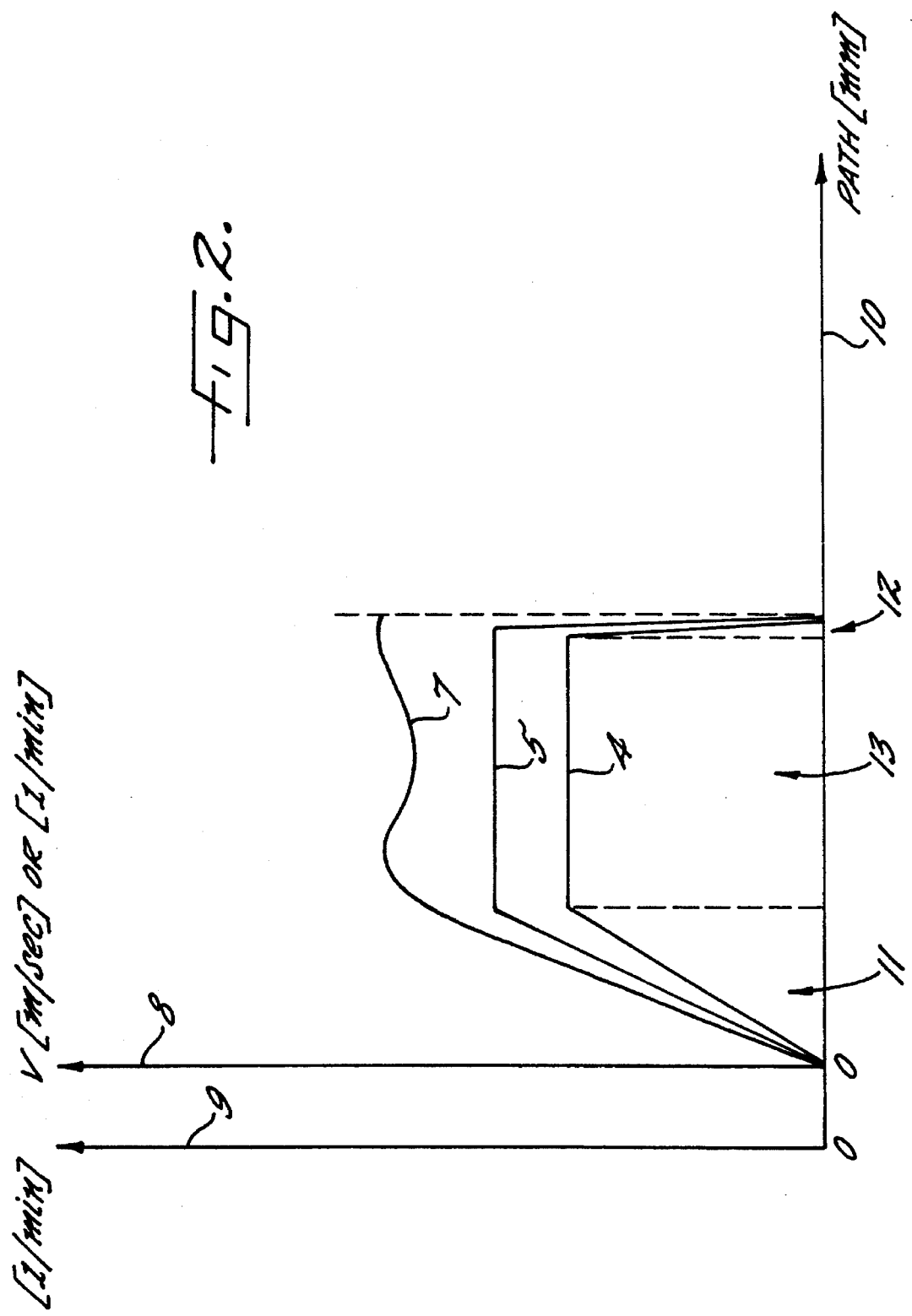

METHOD FOR THE COMPUTER-ASSISTED CONTROL OF A MACHINE OR PROCESS

The invention relates to a method for the computer-assisted control of a machine or process using a process computer connected to the machine, installation, or the like via an interface, a monitor connected to the process computer for a graphic display of the machine or process cycle, and an input device, preferably in the form of a keyboard, for programming the control or predetermining set values, the control being based on a machine or process-specific flow chart.

Control methods of the kind in question have been known for years. It has been common practice to program the control of, for example, a machine by a means of a so-called CNC program language. Parametrically predetermined, operational data sets allow the operator to define, for example, a position or a path to be covered by a feed, a required acceleration of the drive motor, etc., and further parameters, such as for example a maximal liquid throughput of a metering device. A lineup of operational data sets thus allows to control the entire process or machine cycle. Other known methods operate in similar manner.

However, in practice the known control methods as described above are extremely problematic in practice. On the one hand, such controls necessitate a rigid programming. Accordingly, it is necessary to predetermine a corresponding program at the manufacturer's end, or at least at the end of a software producer. The operator of such a control can only influence the parameters. The control sequence is only variable by changing the software, or in the case of an NC control by supplementing operational data sets.

Furthermore, the control methods known so far fail to offer a predeterminable real-time behavior of the process to be controlled. Regardless of the machine or process-specific characteristic data, the control predetermines values which do not absolutely correspond with the data actually realized by the machine or in the process. For example, the known methods allow to consider nonlinearities of accelerations or any starting behavior of motors only conditionally. The operator would have to perform the programming in infinitesimally small steps, for which he would require an endless amount of operational data sets. Such a procedure is on the one hand extremely time-intensive, and on the other hand not feasible as a result of the limited storage capacity of any process computer.

In machining centers, for example when turning steel in lathe work centers, it has been practice to graphically predetermine the individual machining steps. These are exclusively desired values which do in no way consider the time behavior of the machine. The drive of the tool and/or workpiece is always based on linear acceleration values which do not correspond with reality.

A consequence of control methods known so far is the fact that for setting up a control by numerous trial machining operations, it is necessary to adapt the control to the actual process. In so doing, the adaptation to actual conditions, i.e., to the machine or process-specific data, is to be performed by the operator himself who always has to estimate same. As a result, there is always the risk of a constant excess or shortage of control. In the end, the methods of controlling a machine or process known so far, in particular in the course of their tooling or setup, are extremely expensive, inasmuch as the real-time behavior of the machine or process cannot be considered. Aside from that, the known control methods are always dependent on a predetermined program, i.e., they are inflexible in their application and can be influenced by the operator only with respect to parameters. A change in program is at most possible by changing the software, or in the case of an NC control by adding operational data sets.

It therefore the object of the present invention to provide a method of controlling a machine or a process, which allows to consider the real-time behavior of the machine or process already during the setup of the control method, and furthermore to make the method also flexible with respect to the control sequence.

The method of the present invention accomplishes the foregoing object by the features of claim 1. Accordingly, a method of the kind in question is characterized in that programming of the control operation or the predetermination of the machining steps proceeds from vectors and/or curves, and the time behavior of the machine or process is considered in that the machining steps, and thus the individual movements and operations are converted by including the machine and process-specific data into the form of a process-linked polygonal course.

In accordance with the invention, it has first been recognized that programming of the control operation or pre-determination of the machining steps, i.e. the predetermination of the entire process, proceeds from vectors and/or curves, which are based on a machine or process-specific flow chart. With the inclusion of the machine and process-specific data, the individual machining steps represented in vectors or curves and, thus, the individual movements and operations are then converted into the form of a polygonal course. This polygonal course is accordingly linked to the respective process. Since a polygonal course is a system of line segments in a Euclidean space, the more straight lines for predetermining a movement are needed, the greater the deviation of the movement from an ideal linear behavior. The greater the necessity of a precise control, the more line segments need to be incorporated in the polygonal course, which is again to be derived from the machine and process-specific data.

With respect to a particularly simple handling of the method in accordance with the invention, it is now of special advantage to perform a graphical input for a definition of the vectors and/or curves. In so doing, it is possible to input the curves and vectors, preferably via a cursor, with the use of a menu, or with the use of a mouse. Likewise however, it is possible to apply different methods of input for the definition of a vector or a curve.

Binary events of the control, for example, the startup of a metering device or the stop of an induction coil, can be input in a further advantageous manner via the keyboard, or likewise via a menu preferably operable by means of a cursor. The events are linked to the curves or the polygonal course calculated from the curves, or the time or path axis of the graphic containing the curves or the polygonal course. In other words, these events are associated to certain coordinates, the latter being path or time coordinates.

The machine and process-specific data are advantageously stored in a data base specially provided therefor and can be queried at any time for a conversion of the vectors and curves into the polygonal courses which consider the real-time behavior of the machines or process, and allocated to the vectors and curves or the polygonal courses resulting therefrom.

With respect to a particularly flexible configuration of the method in question it is of further advantage, when the machine and process-specific data can be varied or newly predetermined preferably via the keyboard. Thus, the machine and process-specific data are not inflexibly predetermined, but can rather be adapted to external conditions or changes in performance as a result of wear or the like. As a result, the control is highly flexible and manipulatable by the operator in any desired manner.

Machine cycles and processes of any kind are composed not exclusively of feeds, rotations, or the like, i.e., of paths to cover or speeds or accelerations, but also of "stationary" events which are very simply activated upon reaching a certain position or after covering a certain distance over a certain period of time. Consequently, it is of special advantage, when the control operates as a function of a path or a function of time in accordance with the kind of machining operation. Accordingly, the course of the machining operation is graphically displayed on the monitor as a mixed polygonal course presentation. Depending on the kind of machining operation, the polygonal course may alternatively be a function of a path or a function of time or be path-controlled and time-controlled. In other words, in such a case the polygonal course is altogether composed of path-dependent and time-dependent polygonal course elements which can be combined in any desired manner depending on the required sequence of machining operations. With respect to a better overview of the entire process sequence it is further advantageous that the entire process with all movements and machining operations is displayed as a function of path and/or a function of time in a single graph. The path or time axis representing the sequence of the process is limited only by the storage capacity of the computer. Taking an "infinite" storage capacity as a basis, the path or time axis will accordingly be infinite. To be able to view such an "infinite" time axis for checking the process sequence on the screen, the latter can be scrolled horizontally for a quasi endless display of the process sequence. Accordingly, the operator may approach every position on the time axis and check the predetermined set value input of the process.

Since now, when machine or process-specific data are taken as a basis, the set values predetermined by the polygonal course also deviate—at least during the setup of the control— more or less from the actual values of the machine or process which are realized by the control, it is of great advantage for the "fine adjustment" of the control, when the actual values of the machine or process realized with the control are graphically superposed on the screen upon the predetermined set values. To this end the actual values obtained in reality could be superposed either upon the curves or vectors forming the origin for the control or upon the polygonal courses calculated from the curves or vectors. Essential for this superimposition is in any event that the realized actual values can be compared with the set values, so that the operator is able to correctly control or influence the machine cycle or process.

The actual values to be compared with the set values can selectively be presented or displayed on the screen in form of curves or vectors in curve shape. It will be especially advantageous, when the actual values can be faded in for example, so as to be able to check the entire polygonal course over ranges.

The actual values determined for example within the scope of a so-called zero passage allow to correct now the set values as a function of the actual values and thus the polygonal course defining the process. Where deviations of the actual values from the set values are considerable, where, for example, the inertia of a motor at startup has not adequately been considered, it will be possible to either change the characteristic data of the machine provided for the calculation of the polygonal course, or to interfere directly with the polygonal course by changing the vectors or curves underlying the polygonal course. The thus calculated, new polygonal course or the thereby predetermined set values can then be compared again in a subsequent passage with the actual values resulting from these set values. Essential is in any event that a constant feedback from the process to the control is made possible, whereby the control becomes a regulation in the actual sense.

The actual values realized with the control may advantageously be stored and exchanged altogether against the previous set values for a calculation of a polygonal course adapted to machine and process-specific data. Within the scope of such a control, an optimization could occur to the extent that in the event of intolerable deviations the realized actual values always replace the originally predetermined set values, so that the system operates as a quasi "teachable" system. In alternating, one would then well approach an optimum.

Furthermore, the optimized set values could be taken over by an automating device and be stored in a data base for any desired recall. Optimized set values associated to certain machines and/or processes could be filed in a directory, so that it is possible to allocate always optimal set values or optimal polygonal courses to the machines or processes. The saving or storing of the optimized set values could occur such that the latter can again be selected in accordance with different selection criteria. A selection criterion could be the user number of an operator, the allocation to a machine or a process or the like.

As regards the development of the method based on a control of the kind in question, it is of special advantage, when vectors and curves representing process sequences, or polygonal courses calculated therefrom on the basis of machine or process-specific data are included. By simulation, it would be possible to "design" a method on the basis of machine and process-specific data, the real-time behavior of real machines or processes being considered already during the simulation.

It would now be possible to use the control method of the present invention also for a 100% testing of material, product, function, or the like. This could advantageously be effected such that the actual process sequence is followed by a nondestructive testing of material, product, function, etc, and that the errors detected at predetermined set values of the control are associated with the respective actual value pattern and thus also with the corresponding set values of the control. Likewise, the detected error could be associated also with a certain deviation of the actual values from the set values. The resultant correlation will make it possible, at a certain deviation of the actual values from the set values, to conclude therefrom an error probability during the process sequence. By avoiding the deviations causing the detected errors, it would be possible to reduce or minimize also the error probability of the machine cycle or the process sequence. In a next step, it would be necessary to correct the set values based on the correlation determined between an error and actual value, or error and deviation between actual value and set value, so as to be able to recalculate new polygonal courses from the corrected curves or vectors for the control of the process sequence.

As regards a universal control of process sequences it will be of special advantage, when a table of events can be associated with desired points of the curve predetermining the set values, or of the polygonal course predetermining the set values. This table of events could include data for activating, for example, a heating system for heating the workpiece to be machined, or data relating to a spraying system for spraying the workpiece to be machined. These data could be unrelated or only marginally related to the machining process. Naturally, these data could also relate directly to the machining process. The tables of events associated to certain points in the polygonal course could selectively be displayed on the screen by fading in a mask. Finally, the table of events could also be changed or input anew from the keyboard. Furthermore, there could occur a feedback of data of the table of events to the calculated polygonal course, and thus to the process to be controlled, so as to be able to link by means of the table of events and the feedback related thereto, for example, peripheral processes of machine cycles to the actual process sequence.

Finally, there could be provided a printer capable of producing graphics to document the curve-controlled predetermined program. Advantageously, the printer could be a printer capable of producing colored graphics, inasmuch as different coloration allows to display the vectors, curves, polygonal courses, actual values in any kind of presentation, faded-in masks, and the like in a manner optimally distinguishable from one another.

There are various possibilities of configuring and further developing the teaching of the present invention in an advantageous manner. To this end, reference is made on the one hand to the claims dependent on claim 1, and on the other hand to the following description with reference to the drawing of a graphically illustrated process sequence on the basis of the control method in accordance with the invention. In connection with the description of this process sequence based on the control in accordance with the invention and with reference to the drawing, also generally preferred embodiments and further developments of the teaching are described. In the drawing:

FIG. 1 shows schematically in a diagram the graphic display of a process sequence with a presentation of a mixed polygonal course to predetermine set values; and FIG. 2 shows schematically in a diagram an auxiliary graph of rotational speed, speed, delivery volume, or the like as a function of the path.

The diagram selected in FIG. 1 may represent, for example, a graphically illustrated control of a hardening device. Plotted on the two ordinates 1, 2 could be on the one hand the feed of the workpiece (ordinate 1), on the other hand, the delivered quantity (ordinate 2) of a fluid required in a hardening operation for spraying the workpiece to be hardened. The abscissa 3 can be displayed endlessly by scrolling the screen, the time needed for the machining operation there being shown in seconds. The straight line 4 shows the ideal process of the workpiece to be hardened in the region of line segment S to instant T, a constant speed being here prerequisite from the beginning of the feed movement to the end of the feed movement. Such a predetermination, as is common in conventional control methods, is however not realistic.

Taking the machine and process-specific data as a basis, at first, a maximum acceleration, if need be, is required at the beginning of movement 11, subsequently a movement at constant speed 13, and toward the end of the machining operation or movement a negative acceleration 12 or a braking of the workpiece. These actual conditions are considered by the calculated polygonal courses 5 and 6, the initial acceleration 11, the constant speed 13 following acceleration 11, and the final braking 12 being based respectively on a linear action. Naturally, it is possible to specificize or further adapt these three actions each displayed as a straight line in that they are resolved into further line segments of the polygonal course.

The polygonal courses 5 and 6 differ in that polygonal course 5 has the same machining time T when compared with vector 4 which predetermines the set values, but is formed by a variable rotational speed for advancing the workpiece. In comparison therewith, polygonal course 6 exhibits a maximum acceleration and constant speed relative to vector 4, the time needed altogether for covering the distance S being above the time T predetermined by vector 4.

Until the completion of the workpiece advance, i.e., until the path S has been covered, the control or the control predetermined by the polygonal course is path-dependent. Subsequently, the workpiece is only sprinkled or sprayed, which again is predetermined by actual values of curve 7. In the region of the path-dependent polygonal course, this action is always superposed upon the latter. After covering the path S, this is however the only further action within the scope of the entire sequence of the process. This means that, as a result of absent movement in the further process, the polygonal course progresses best as a function of time. In other words, the illustration in FIG. 1 is a presentation of a mixed polygonal course related to the graphically illustrated control of the process under discussion.

Naturally, it is possible to illustrate any further process sequences within the scope of the illustration selected with an endless abscissa, there having however been selected in the present illustration only two actions—advancing and spraying—for the sake of a better overview.

FIG. 2 is a graphic which may selectively be faded in on the screen, the ordinate 8 of this Figure representing the speed, and the ordinate 9, in usual manner, the volume delivered for spraying the workpiece. The abscissa 10 represents the distance covered, the spraying operation being shown only up to the completion of the displacement of the work piece, i.e., until path S has been covered. Accordingly, the straight lines or curves 4, 5, and 7 represent, as in FIG. 1, both the course predetermined by the vector and the course predetermined by the polygon taking into account the machine and process-specific characteristic data. The regions 11 and 12 show a linear acceleration or a linear deceleration, and the region 13 a constant speed during the advance of the workpiece or a constant rotational speed.

As regards usable hardware, it should be emphasized that a personal computer of industrial design is considered as process computer, which includes, for example an 80386SX, an 80386DX, or an 80486 processor, i.e., a rapid central processing unit. The 89386SX and 0386DX processors require in addition an arithmetic processor. For the display of the curve paths a 14" or larger color monitor is advantageously used, a multifrequency monitor being particularly suitable.

The colored graphic chart necessary for the control is selected in accordance with the VGA or TIGA standard, and has its own graphic processor.

The hard disk advantageously used in accordance with the ESDI standard is equipped with at least 40 MBytes up to several hundred MBytes. The hard disk should have short access times of at most 20 msec. The hard disk controller should have an 1:1 interleave.

To edit the curves and vectors, a microsoft compatible mouse or a microsoft compatible trackball is used.

The connection to the memory programmable control, for example, Ciematik 25 (registered trademark of Siemens) is effected with a rapid coupler, it being possible to select, for example, an Ethernet bus with 10 MBits/sec, or a coupler of the internal buses of the PC and SPS via a dual port RAM with a data communication of up to 200 KBytes/sec. In this instance, the PC is plugged or pushed into a central unit frame of the memory programmable control.

Finally, to document the curve-controlled predetermined program, a color printer capable of producing graphics is advantageously used.

In conclusion, it should be emphasized that the above-described embodiment of a control as well as the suggested hardware configuration serve only to describe by way of example the teaching or method of the present invention, and do by no means limit the teaching in accordance with the invention.

I claim:

1. A method for the computer-assisted control of a machine cycle using a process computer connected to a machine via an interface, a monitor having a screen connected to the process computer for graphic display of the machine cycle, and an input means for programming the process computer, the method comprising the steps of:

determining a machine specific flow chart for the machine cycle based upon machining steps of the machine, including individual movements and operations of the machine, during the machine cycle, said machine specific flow chart representing time behavior of the machine during the machine cycle;

identifying process specific parameters based upon machining steps to be performed by the machine during the machining cycle for a specific machining process;

determining a first set of values for the process specific parameters, said first set of process specific parameter values being based upon the machining steps to be performed by the machine during the machining cycle for a specific machining process;

generating a plurality of vectors or curves based upon the machine specific flow chart;

converting the plurality of vectors or curves, utilizing the first set of process specific parameter values, into the form of a connected course;

linking the connected course to the machine;

displaying a graph of the connected course on the monitor as a function of at least one of path and time portions of the machine during the machine cycle;

controlling the machine based on the connected course displayed on the monitor during the machine cycle;

determining a second set of values for the process specific parameters based on the controlling step; and graphically superimposing the second set of process specific parameter values based on the controlling step on the screen upon the first set of process specific parameter values.

2. The method of claim 1 wherein the input means includes a cursor or a mouse, and further comprising the step of graphically inputting the machine specific flow chart via the cursor or the mouse to define the vectors or curves.

3. The method of claim 1 wherein at least one of said process specific parameters represents a binary event, further comprising the steps of inputting the binary events using the input means, and linking the binary events to at least one of the curves, the polygonal course converted from the curves, and the time or path portions of the machine displayed on the graph.

4. The method of claim 1, further comprising the step of storing the process specific parameters in a data base thereby permitting retrieval of the process specific parameters to be used for converting the vectors and curves into polygonal courses.

5. The method of claim 1, further comprising the step of changing the process specific parameters or determining the process specific parameters for a second time.

6. The method of claim 1, wherein the path or time portions of the machine displayed on the graph and representing the polygonal course for the machine cycle are limited only by storage capacity of the process computer.

7. The method of claim 6, wherein the screen can be scrolled horizontally for a quasi endless display of the machine cycle.

8. The method of claim 1, wherein the second set of process specific parameter values are selectively displayed on the screen in the form of curves and vectors in curve shape.

9. The method of claim 1, further comprising the step of correcting the first set of process specific parameter values as a function of the second set of process specific parameter values, wherein the polygonal course used to control the machine cycle is corrected.

10. The method of claim 1, further comprising the steps of storing the second set of process specific parameter values and converting the vectors or curves, utilizing the second set of process specific parameter values, into the form of a polygonal course adapted to the process specific parameters.

11. The method of claim 1, further comprising the steps of taking the second set of process specific parameter values over by an automating device and storing the taken second set of process specific parameter values in a database.

12. The method of claim 1, further comprising the steps of storing at least one of the first set of process specific parameter values and second set of process specific parameter values in a data base, and selecting at least one of the first set of process specific parameter values and second set of process specific parameter values in accordance with different selection criteria.

13. The method of claim 1, wherein the vectors and curves representing the machine specific flow chart and the polygonal courses converted therefrom utilizing process specific parameters, serve to develop the controlling step.

14. The method of claim 1, further comprising the step of allocating a table of events, said events table containing desired points of the curve or polygonal course, wherein the table of events also contains values which are unrelated or only marginally related to the machine cycle.

15. The method of claim 14, further comprising the step of displaying the table of events on the screen by fading in a mask.

16. The method of claim 14, further comprising the steps of converting the vectors and curves, utilizing the table of events, into a polygonal course and controlling the machine based on the polygonal course converted from the vectors and curves utilizing the table of events.

17. The method of claim 1, wherein a printer is also used by the method, and further comprising the step of printing the curve controlled predetermined program input.

18. A method for the computer-assisted control of a machine cycle using a process computer connected to a machine via an interface, a monitor connected to the process computer for graphic display of the machine cycle, and an input means for programming the process computer, the method comprising the steps of:

determining a machine specific flow chart for the machine cycle based upon machining steps of the machine, including individual movements and operations of the machine, during the machine cycle, said machine specific flow chart representing time behavior of the machine during the machine cycle;

identifying process specific parameters based upon machining steps to be performed by the machine during the machining cycle for a specific machining process;

determining a first set of values for the process specific parameters, said first set of process specific parameter values being based upon the machining steps to be performed by the machine during the machining cycle for a specific machining process;

generating a plurality of vectors or curves based upon the machine specific flow chart;

converting the plurality of vectors or curves, utilizing the first set of process specific parameter values, into the form of a connected course;

linking the connected course to the machine;

displaying a graph of the connected course on the monitor as a function of at least one of path and time portions of the machine during the machine cycle;

controlling the machine based on the connected course displayed on the monitor during the machine cycle;

nondestructive testing of at least one of material, product, and function for detecting errors in the first set of process specific parameter values;

determining a second set of values for the process specific parameters based on the controlling step;

associating errors detected by said nondestructive testing step with the respective values in the second set of process specific parameter values; and determining a deviation between the respective values in the first set of process specific parameter values and the second set of process specific parameter values.

19. The method of claim 18, further comprising the step of correcting the first set of process specific parameter values on the basis of at least one of a correlation between the second set of process specific parameter values and the errors detected in the first set of process specific parameter values, and the first set of process specific parameter values and the deviation between the first set of process specific parameter values and the second set of process specific parameter values, wherein the polygonal courses based thereon are influenced.

* * * * *